US012737856B2

(12) United States Patent
Baek et al.

(10) Patent No.: US 12,737,856 B2
(45) Date of Patent: Sep. 15, 2026

(54) LDCT DENOISING NEURAL NETWORK BASED ON SGM(SCORE-BASED GENERATIVE MODEL) APPARATUS AND METHOD

(71) Applicant: UIF (UNIVERSITY INDUSTRY FOUNDATION), YONSEI UNIVERSITY, Seoul (KR)

(72) Inventors: Jongduk Baek, Incheon (KR); Hojin Jung, Anyang-si (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 174 days.

(21) Appl. No.: 18/934,188

(22) Filed: Oct. 31, 2024

(65) Prior Publication Data

US 2026/0120251 A1 Apr. 30, 2026

(30) Foreign Application Priority Data

Oct. 30, 2024 (KR) ........................ 10-2024-0151607

(51) Int. Cl.
*G06T 5/70* (2024.01)
*G06T 5/60* (2024.01)

(52) U.S. Cl.
CPC .................. *G06T 5/70* (2024.01); *G06T 5/60* (2024.01); *G06T 2207/10081* (2013.01); *G06T 2207/20081* (2013.01); *G06T 2207/20084* (2013.01)

(58) Field of Classification Search
CPC ... G06T 5/70; G06T 5/60; G06T 2207/10081; G06T 2207/20081; G06T 2207/20084; G06T 5/50
See application file for complete search history.

(56) References Cited

FOREIGN PATENT DOCUMENTS

KR 10-2708543 A 9/2024

OTHER PUBLICATIONS

Xia, Wenjun, Qing Lyu, and Ge Wang. "Low-Dose CT Using Denoising Diffusion Probabilistic Model for 20$\times $ Speedup." arXiv preprint arXiv:2209.15136 (2022). (Year: 2022).*

Xiang, Tiange, Mahmut Yurt, Ali B. Syed, Kawin Setsompop, and Akshay Chaudhari. "DDM $Λ 2$: Self-supervised diffusion MRI denoising with generative diffusion models." arXiv preprint arXiv:2302.03018 (2023). (Year: 2023).*

* cited by examiner

*Primary Examiner* — Wassim Mahrouka
(74) *Attorney, Agent, or Firm* — Studebaker Brackett PLLC

(57) ABSTRACT

The present disclosure relates to an SGM-based LDCT denoising neural network apparatus, wherein the apparatus comprises an input unit receiving an LDCT image, a score model unit processing the LDCT image at each time step by constructing a score-based generative model pre-trained to remove noise from the LDCT training image, an image adjustment unit adjusting noise characteristics of the LDCT image by utilizing the LDCT image at a reference time step through the score-based generative model and generating a noise-fitted LDCT image, a denoising unit progressively removing noise from the noise-fitted LDCT image through iterative input and output operations for each reverse time step of the score-based generative model, and a noise-reconstructed image output unit outputting a noise-reconstructed image generated based on the noise-fitted LDCT image.

10 Claims, 5 Drawing Sheets

100
110
LDCT
130
Langevin MCMC
$t = t_{fit}$
120
Pretrained
Score model
$s_{\theta^*}(x,t)$
LDCT$_{fit}$
140
SDE Solver
$t = \{t_{fit}, t_{fit-1}, \cdots, t_0\}$
150
Output
Noise Fitting
Reverse Process 200
Input unit
210
Score model unit
220
Controller
260
Noise-reconstructed image output unit
250
Image adjustment unit
230
Denoising unit
240

300
Communication port unit
390
Network input/output unit
370
User input/output unit
350
Memory
330
Processor
310
BUS

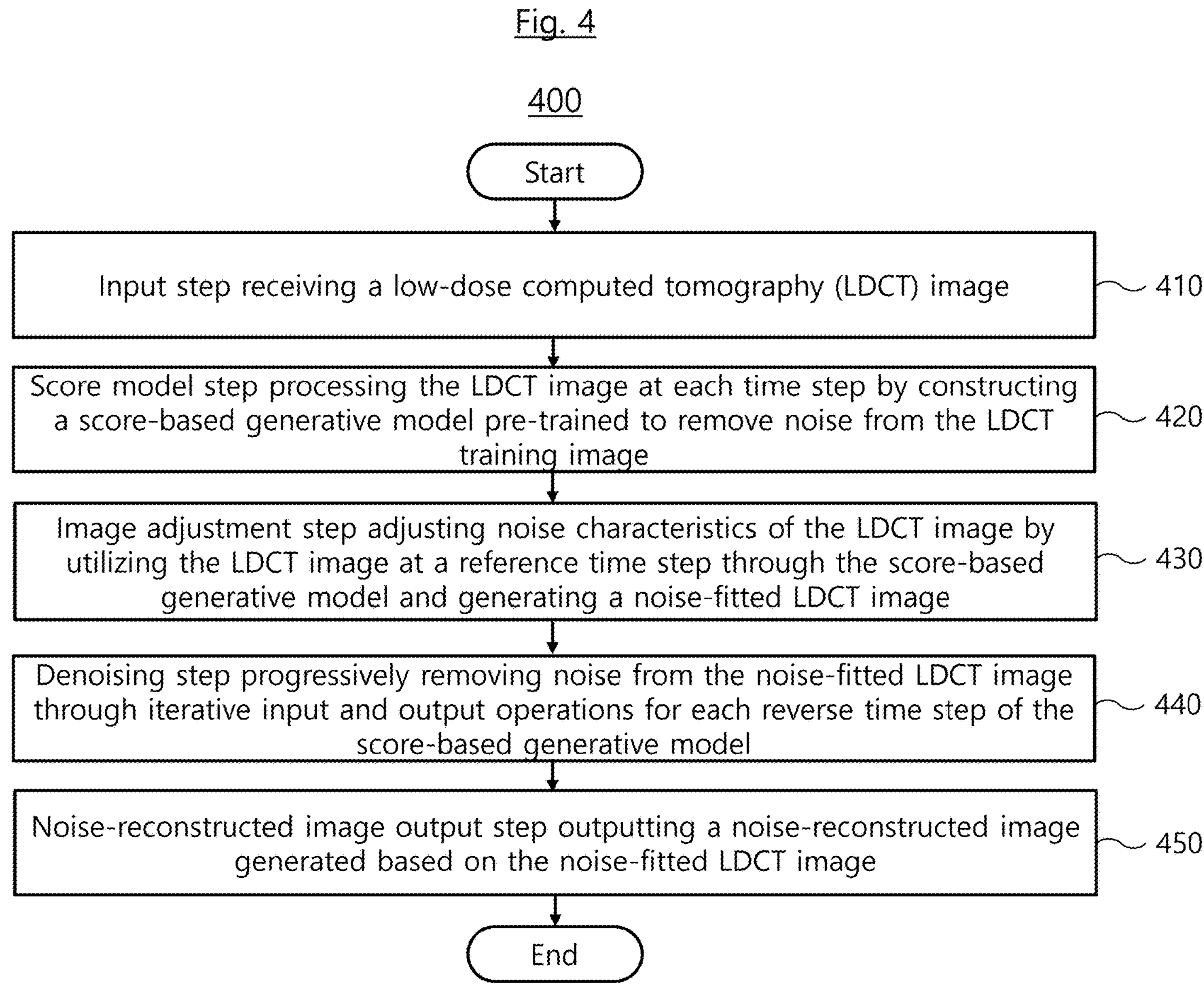
Fig. 4
400
Start
Input step receiving a low-dose computed tomography (LDCT) image
410
Score model step processing the LDCT image at each time step by constructing a score-based generative model pre-trained to remove noise from the LDCT training image
420
Image adjustment step adjusting noise characteristics of the LDCT image by utilizing the LDCT image at a reference time step through the score-based generative model and generating a noise-fitted LDCT image
430
Denoising step progressively removing noise from the noise-fitted LDCT image through iterative input and output operations for each reverse time step of the score-based generative model
440
Noise-reconstructed image output step outputting a noise-reconstructed image generated based on the noise-fitted LDCT image
450
End

LDCT DENOISING NEURAL NETWORK BASED ON SGM(SCORE-BASED GENERATIVE MODEL) APPARATUS AND METHOD

CROSS-REFERENCE TO RELATED APPLICATION

This application claims under 35 U.S.C. § 119(a) the benefit of Korean Patent Application No. 10-2024-0151607 filed on Oct. 30, 2024, the entire contents of which is incorporated herein by reference.

TECHNICAL FIELD

The present disclosure relates to a low-dose computed tomography denoising technology and, more specifically, to a score-based generative model (SGM)-based LDCT denoising neural network apparatus and method, which may improve the quality of low-dose computed tomography (LDCT) images by removing noise from LDCT images through the SGM, thereby providing image quality comparable to that of normal-dose computed tomography (NDCT).

BACKGROUND

Computed Tomography (CT) is a technology that uses radiation to reconstruct the internal details of the human body through cross-sectional images. This technology plays an essential role in the medical field for diagnosing diseases and establishing treatment plans. However, a low-dose imaging technique is needed to reduce the risk associated with radiation exposure during CT scans.

Low-dose CT (LDCT) scans reduce radiation exposure to patients by lowering the radiation dose. However, low-dose CT has a lower signal-to-noise ratio (SNR) compared to normal-dose CT, resulting in degraded image quality. The degradation in image quality leads to reduced accuracy of diagnosis; to solve this problem, various image reconstruction and noise reduction techniques have been studied.

In the previous approaches, noise reduction techniques primarily relied on iterative reconstruction (IR) and convolutional neural networks (CNNs). However, these methods reveal limitations in improving image quality and are hindered in practical applications due to difficulties in obtaining training data.

Recently, diffusion models have gained attention for their ability to generate high-quality images by utilizing the characteristics of training data. The diffusion model is effective in reconstructing contaminated images or removing artifacts and may also be used to remove sparse view artifacts from CT images. However, since it is difficult to learn CT images combined with text and collect large-scale training data, direct application of the diffusion model used for ordinary images is limited.

Korean registered patent No. 10-2708543 (Sep. 13, 2024) provides a diffusion model-based apparatus and method for converting low-resolution CT images into high-resolution ones by removing noise from CT images and improves the quality of low-resolution CT images, thereby enabling more accurate diagnosis in the medial field.

A method for converting a computed tomography image to a high-resolution image using a diffusion model, which is performed by a computing device including at least one processor, comprises generating training data from the original image using a diffusion model, training a convolutional neural network (CNN) model including an encoder and a decoder using the training data, generating an enlarged image by linear interpolation of an input image, generating a high-resolution residual using a random vector extracted from a Gaussian distribution and the enlarged image, and generating a high-resolution image by combining the enlarged image and the high-resolution residual.

PRIOR ART REFERENCES

Patent Document

Korean registered patent No. 10-2708543 (Sep. 13, 2024)

DESCRIPTION

Problem to be Solved

One embodiment of the present disclosure provides an SGM-based LDCT denoising neural network apparatus and method, which may improve the quality of low-dose computed tomography (LDCT) images by removing noise from LDCT images through the score-based generative model (SGM), thereby providing image quality comparable to that of normal-dose computed tomography (NDCT).

One embodiment of the present disclosure provides an SGM-based LDCT denoising neural network apparatus and method, which may reconstruct high-quality images by reflecting noise occurring at various time steps of LDCT images by adding noise to LDCT training images at each time step, training on the noised LDCT images, and generating noise-fitted LDCT images through the score-based generative model (SGM).

One embodiment of the present disclosure provides an SGM-based LDCT denoising neural network apparatus and method, which performs iterative denoising through application of a stochastic differential equation (SDE) to reconstruct high-quality images by progressively reducing noise during the inverse transformation process.

Solution

Among embodiments, an SGM-based LDCT denoising neural network apparatus comprises an input unit receiving a low-dose computed tomography (LDCT) image, a score model unit processing the LDCT image at each time step by constructing a score-based generative model pre-trained to remove noise from the LDCT training image, an image adjustment unit adjusting noise characteristics of the LDCT image by utilizing the LDCT image at a reference time step through the score-based generative model and generating a noise-fitted LDCT image, a denoising unit progressively removing noise from the noise-fitted LDCT image through iterative input and output operations for each reverse time step of the score-based generative model, and a noise-reconstructed image output unit outputting a noise-reconstructed image generated based on the noise-fitted LDCT image.

The score model unit may train the score-based generative model on noise-added data at various time steps of the LDCT training image. The score model unit may remove the noise of the LDCT image at the reference time step ($t=t_{fit}$) and provide the noise-removed LDCT image as an input image to the image adjustment unit. The score model unit may process the noise of the LDCT image from the reference time step ($t=t_{fit}$) to the initial time step ($t=0$) at each reverse time step and provide the processed LDCT image as an input image to the denoising unit.

The image adjustment unit may adjust the noise characteristics through a Langevin MCMC (Markov Chain Monte Carlo) process. The image adjustment unit may perform a noise filtering process on the LDCT image through a noise characteristic adjustment process.

The denoising unit may generate the noise-reconstructed image for the noise-fitted LDCT image by reversely utilizing the LDCT image at the reference time step to the LDCT image at the initial time step through the score-based generative model. The denoising unit may generate the noise-reconstructed image by applying a stochastic differential equation (SDE). The denoising unit may perform an inverse transformation reconstruction process on the LDCT image through a noise-temporally inverse transformation process.

Among embodiments, a Score-based Generative Model (SGM)-based LDCT denoising neural network method performed in an SGM-based LDCT denoising neural network apparatus comprises an input step receiving a low-dose computed tomography (LDCT) image, a score model step processing the LDCT image at each time step by constructing a score-based generative model pre-trained to remove noise from the LDCT training image, an image adjustment step adjusting noise characteristics of the LDCT image by utilizing the LDCT image at a reference time step through the score-based generative model and generating a noise-fitted LDCT image, a denoising step progressively removing noise from the noise-fitted LDCT image through iterative input and output operations for each reverse time step of the score-based generative model, and a noise-reconstructed image output step outputting a noise-reconstructed image generated based on the noise-fitted LDCT image.

Effect

The present disclosure may provide the following effects. However, since it is not meant that a specific embodiment has to provide all of or only the following effects, the technical scope of the present disclosure should not be regarded as being limited by the specific embodiment.

An SGM-based LDCT denoising neural network apparatus and method according to one embodiment of the present disclosure may improve the quality of low-dose computed tomography (LDCT) images by removing noise from LDCT images through the score-based generative model (SGM), thereby providing image quality comparable to that of normal-dose computed tomography (NDCT).

An SGM-based LDCT denoising neural network apparatus and method according to one embodiment of the present disclosure may reconstruct high-quality images by reflecting noise occurring at various time steps of LDCT images by adding noise to LDCT training images at each time step, training on the noised LDCT images, and generating noise-fitted LDCT images through the score-based generative model (SGM).

An SGM-based LDCT denoising neural network apparatus and method according to one embodiment of the present disclosure may perform iterative denoising through application of a stochastic differential equation (SDE) to reconstruct high-quality images by progressively reducing noise during the inverse transformation process.

BRIEF DESCRIPTION OF THE DRAWINGS

FIG. 4 is a flow diagram illustrating the operation of the SGM-based LDCT denoising neural network device 100 of FIG. 1.

DETAILED DESCRIPTION

Figure 1:
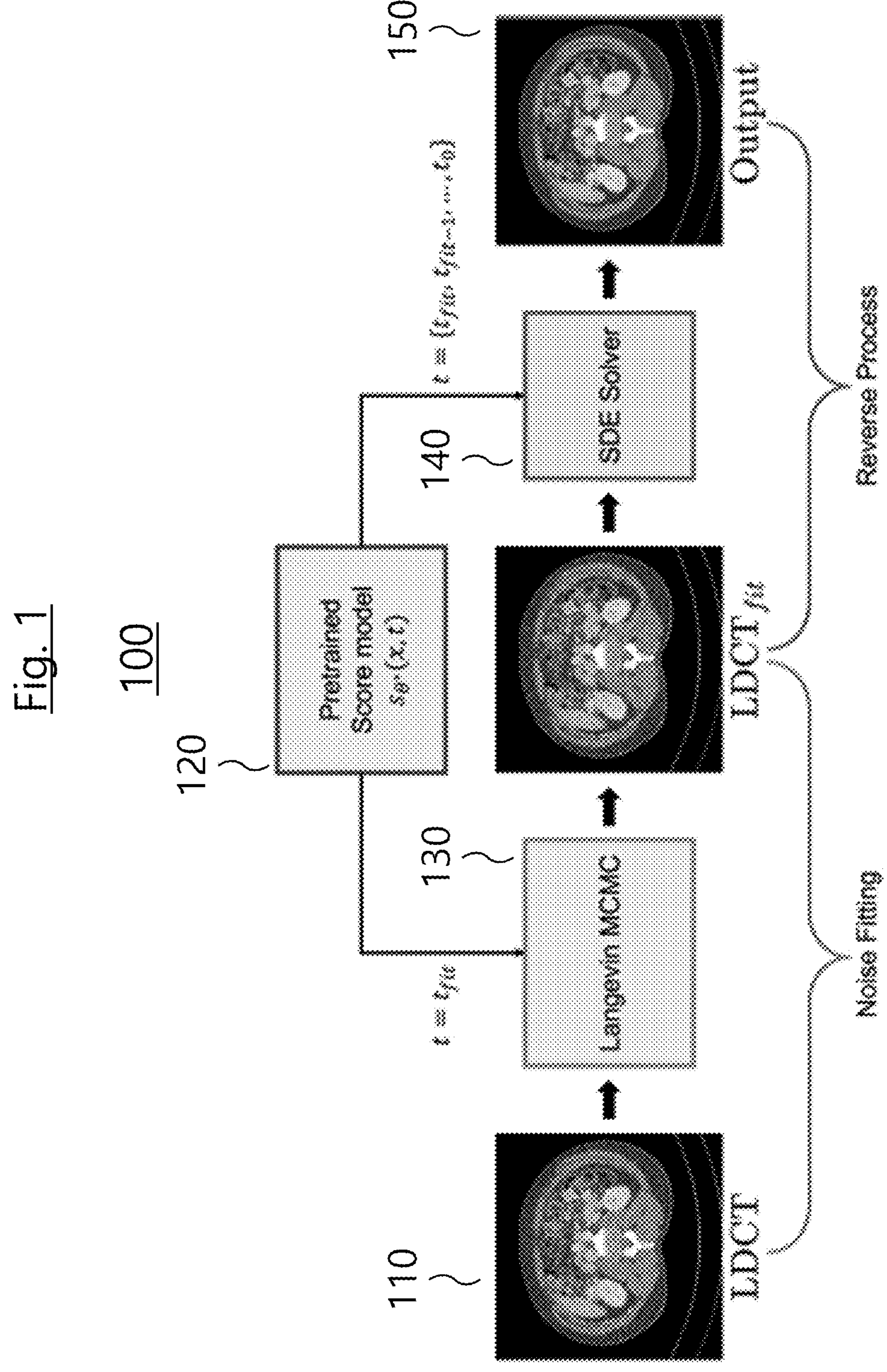
FIG. 1 illustrates an SGM-based LDCT denoising neural network apparatus 100 according to one embodiment of the present disclosure.

Specific structural or functional descriptions in the embodiments of the present disclosure introduced in this specification or application are only for description of the embodiments of the present disclosure. The descriptions should not be construed as being limited to the embodiments described in the specification or application. The present disclosure may, however, be embodied in many different forms, but should be construed as covering modifications, equivalents or alternatives falling within ideas and technical scopes of the present disclosure. Further, since effects disclosed herein do not mean that a specific embodiment should include all or only the effects, the scope of the present disclosure should not be construed as being limited thereto.

Meanwhile, the meaning of terms described herein will be understood as follows.

It will be understood that, although the terms “first”, “second”, etc. may be used herein to distinguish one element from another element, these elements should not be limited by these terms. For instance, a first element discussed below could be termed a second element without departing from the teachings of the present disclosure. Similarly, the second element could also be termed the first element.

It will be understood that when an element is referred to as being “coupled” or “connected” to another element, it can be directly coupled or connected to the other element or intervening elements may be present therebetween. In contrast, it should be understood that when an element is referred to as being “directly coupled” or “directly connected” to another element, there are no intervening elements present. Other expressions that explain the relationship between elements, such as “between”, “directly between”, “adjacent to” or “directly adjacent to” should be construed in the same way.

In the present disclosure, the singular forms are intended to include the plural forms as well, unless the context clearly indicates otherwise. It will be further understood that the terms “comprise”, “include”, “have”, etc. when used in this specification, specify the presence of stated features, integers, steps, operations, elements, components, and/or combinations of them but do not preclude the presence or addition of one or more other features, integers, steps, operations, elements, components, and/or combinations thereof.

In each step, reference characters (e.g. a, b, c, etc.) are used for the convenience of description. The reference characters do not designate the order of the steps, and the steps may be performed in a different order unless the context clearly indicates otherwise. That is, the steps may be performed in the specified order, may be performed substantially simultaneously, or may be performed in a reverse order.

The present disclosure can be implemented as a computer-readable code on a computer-readable recording medium. The computer-readable recording medium includes all types of recording devices in which data readable by a computer system is stored. Examples of the computer-readable recording medium include ROM, RAM, CD-ROM, magnetic tape, floppy disk, an optical data storage device, etc. In addition, the computer-readable recording medium may be distributed in a computer system connected via a network, so that computer-readable codes may be stored and executed in a distributed manner.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 illustrates an SGM-based LDCT denoising neural network apparatus 100 according to one embodiment of the present disclosure.

FIG. 1 illustrates the process of applying the early step skipping method of the score-based generative model (SGM) for low-dose computed tomography (LDCT) denoising by the SGM-based LDCT denoising neural network apparatus 100, where the LDCT denoising neural network apparatus 100 may receive an LDCT image, perform noise fitting, and finally output a high-quality image through the denoising process.

The SGM-based LDCT denoising neural network apparatus 100 may include an input unit 110, a score model unit 120, an image adjustment unit 130, a denoising unit 140, and a noise-reconstructed image output unit 150.

The input unit 110 may perform the function of receiving a low-dose computed tomography (LDCT) image.

The score model unit 120 is a pre-trained, score-based generative model (SGM) that may provide a model for removing noise from an LDCT image. The score model unit 120 is a model that has learned the noise characteristics of LDCT images, which may be used in the noise removal process at subsequent stages.

The image adjustment unit 130 may adjust the noise characteristics of the input LDCT image through the Langevin MCMC (Markov Chain Monte Carlo) process. Through this process, the image adjustment unit 130 may generate a noise-fitted LDCT image $LDCT_{fit}$ by aligning the noise characteristics of the LDCT image with a distribution that the score model may predict.

The denoising unit 140 may receive the $LDCT_{fit}$ image as input through the SDE Solver and perform denoising by progressively removing noise for each step. The denoising unit 140 may generate a high-quality denoising image by removing noise using the score model according to the reverse time steps ($t=t_{fit}, t_{fit-1}, \ldots, t_0$).

The noise-reconstructed image output unit 150 may finally output a high-quality reconstruction image with noise removed. The output unit 150 may improve the quality of an LDCT image, providing an image comparable to the level of an NDCT image.

The SGM-based LDCT denoising neural network apparatus 100 may receive an LDCT image through the input unit 110 and transmit the received LDCT image to the image adjustment unit 130 that performs Langevin MCMC process. The image adjustment unit 130 may adjust the noise characteristics of the LDCT image to generate a noise-fitted LDCT image $LDCT_{fit}$. The image adjustment unit 130 may perform a noise-fitting process that adjusts the noise characteristics of the LDCT image to align with a distribution required by the score model unit 120, thereby allowing the noise characteristics to be effectively applied in the subsequent denoising process.

The denoising unit 140 receives the noise-fitted LDCT image $LDCT_{fit}$ as input and may perform denoising for each step through an inverse transformation process using the score model $S_\theta(x, t)$ of the score model unit 120. The denoising unit 140 performs denoising according to the reverse time steps ($t=t_{fit}, t_{fit-1}, \ldots, t_0$) and may generate a high-quality denoising image by progressively removing noise at each step.

Therefore, the SGM-based LDCT denoising neural network apparatus 100 may effectively remove noise from the LDCT image through the image adjustment unit 130 and the denoising unit 140 and may provide a function of outputting a high-quality image through the noise-reconstructed image output unit 150.

Figure 2:
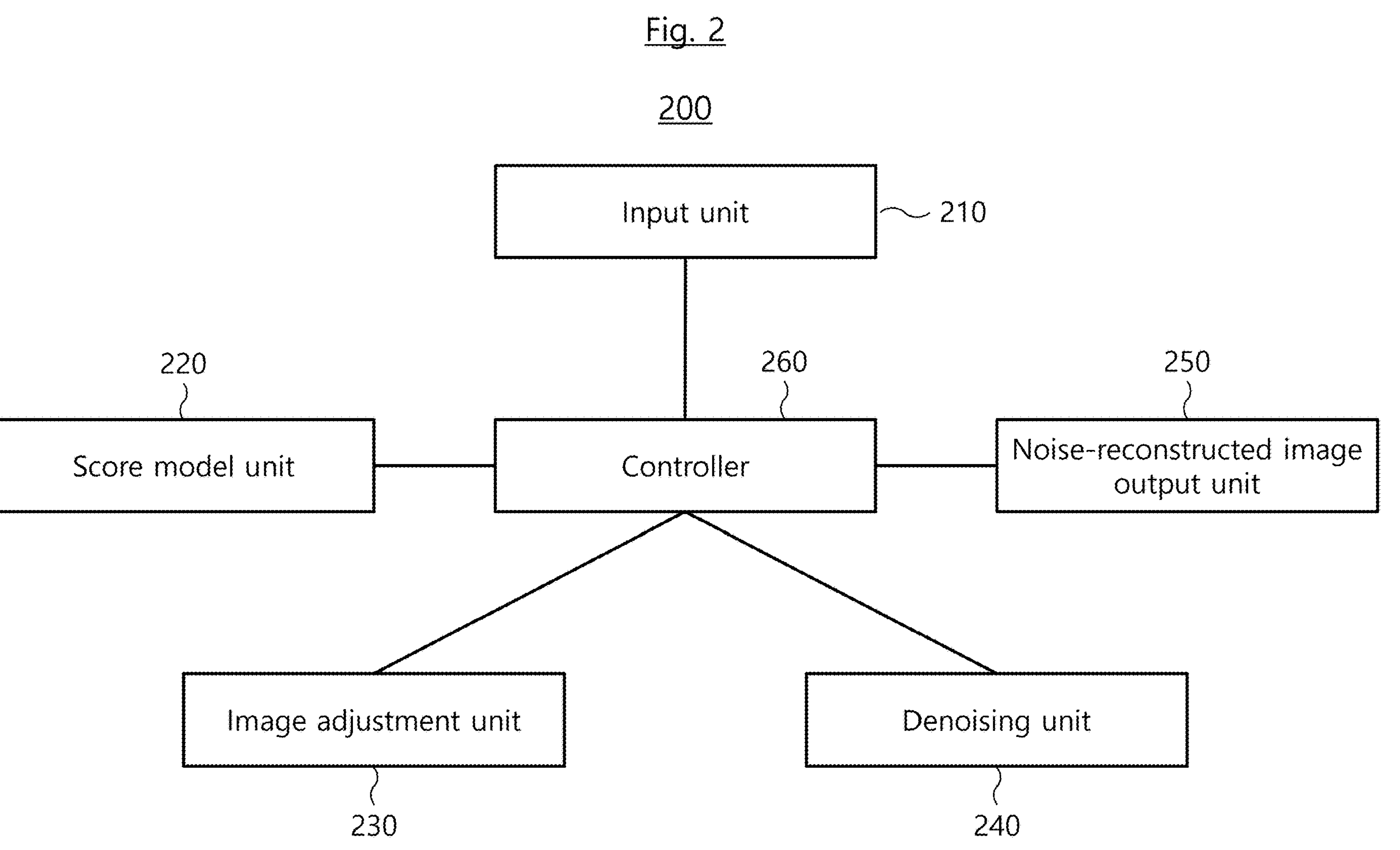
FIG. 2 illustrates the functional structure of the SGM-based LDCT denoising neural network apparatus 100 of FIG. 1.

FIG. 2 illustrates the functional structure of the SGM-based LDCT denoising neural network apparatus 100 of FIG. 1.

Referring to FIG. 2, the SGM-based LDCT denoising neural network apparatus 200 may include an input unit 210, a score model unit 220, an image adjustment unit 230, a denoising unit 240, a noise-reconstructed image output unit 250, and a controller 260.

The SGM-based LDCT denoising neural network apparatus 100 may be designed to improve the quality of LDCT image by effectively removing noise from LDCT images and generating high-quality images based on a score-based generative model (SGM). For example, compared to existing denoising methods, the SGM-based LDCT denoising neural network apparatus 100 may optimize noise characteristics by applying early step skipping and Langevin MCMC processes.

The input unit 210 is a constituting element that receives LDCT images, which may start a series of processing steps to generate high-quality denoising images by sending noisy LDCT images to the denoising neural network apparatus, where the noise is appropriately adjusted and progressively removed.

The score model unit 220 is a constituting element that employs a score-based generative model (SGM) pre-trained to remove noise from LDCT training images and processes LDCT images at each time step, which may train the SGM through noise-added data at various time steps. The score model unit 220 is designed to maximize denoising performance by removing noise at each time step of the LDCT image using the trained model.

The score model unit 220 may remove noise from the LDCT image at the reference time step ($t=t_{fit}$) and provide the noise-removed LDCT image as an input image to the image adjustment unit 230. Through this operation, the noise of the LDCT image is transferred to the next step in its optimized state and thus may be effectively utilized in subsequent processing steps. Also, the score model unit 220 may perform a function of progressively removing noise from the LDCT image in reverse time steps from the reference time step ($t=t_{fit}$) to the initial time step ($t=0$) and sequentially providing the noise-removed LDCT image to the denoising unit 240.

The score model unit 220 may utilize the SGM to remove noise from the LDCT image, and the main equation for this purpose is as follows.

1. Forward Stochastic Differential Equation (SDE)

The score model unit 220 may add noise progressively to the LDCT image through the forward SDE. The forward SDE may be defined as follows by Eq. 1.

$$dx = f(x, t)dt + g(t)dw \quad \text{[Eq. 1]}$$

Here, f(x, t) represents the drift coefficient over time t, g(t) represents the diffusion coefficient, and w represents the standard Brownian motion. Based on the process above, noise may be progressively added to the LDCT image over time.

2. Reverse SDE

The score model unit 120 may utilize the reverse SDE to remove the added noise and reconstruct the LDCT image to closely resemble the original image. The reverse SDE may be defined by Eq. 2 as follows.

$$dx = \left[f(x, t) - g^2(t)\nabla_x \log p_t(x)\right]dt + g(t)d\overline{w} \quad \text{[Eq. 2]}$$

Here, $\overline{w}$ represents the reverse Brownian motion, and $\nabla_x \log P_t(x)$ represents the score function, which may provide a key role in noise removal at each time step.

3. Score Model Training

The score model is trained using the denoising score matching method, and the optimization problem may be formulated by Eq. 3 below.

$$\theta^* = \underset{\theta}{\operatorname{argmin}}\, \mathbb{E}_t\left\{\lambda(t)\mathbb{E}_{x_\theta}\mathbb{E}_{x_t|x_0}\left[\left\|s_\theta(x_t, t) - \nabla_{x_t} \log p_\theta(x_t \mid x_0)\right\|_2^2\right]\right\} \quad \text{[Eq. 3]}$$

Here, $S_\theta(x_t, t)$ represents the trained score model, and $\lambda(t)$ represents the weight over time. The equation may be used to train the score model for removing noise at each time step of the LDCT image.

After the score model is trained, denoising may be performed progressively using the SDE Solver to solve the reverse SDE. At this time, the LDCT image may be reconstructed while reducing noise step by step using the Ancestral Sampling Algorithm. In this way, the score model unit may improve the quality of the LDCT image by reducing noise at each step based on the SDE and the reverse SDE.

The image adjustment unit 230 may adjust the noise characteristics of the LDCT image using the LDCT image from the reference time step through the score-based generative model to generate a noise-fitted LDCT image $LDCT_{fit}$. In this process, the image adjustment unit 230 may adjust the noise characteristics of the LDCT image into a form suitable for processing by the score model, enabling the subsequent denoising step to operate effectively.

The image adjustment unit 230 may adjust the noise characteristics of the LDCT image through the Langevin MCMC process. The Langevin MCMC process transforms the noise distribution of the LDCT image into the form required by the score-based generative model, thereby enabling more precise denoising.

Also, the image adjustment unit 230 may perform noise filtering on the LDCT image through the noise characteristic adjustment process. Through the filtering process, the noise of the LDCT image may be reduced, maximizing the efficiency of subsequent processing in the denoising neural network apparatus.

The image adjustment unit 230 may adjust the noise of the LDCT image using the function above and transfer the LDCT image with the optimized noise characteristics to the denoising unit 240.

The image adjustment unit 230 may perform the Langevin MCMC process to transform noise characteristics of the LDCT image to the form suitable for processing by the score-based generative model. The Langevin MCMC processes a complex noise distribution in an effective manner using a series of updates for noise fitting. The aforementioned process may be expressed by Eq. 4 below.

$$x_{i+1} \leftarrow x_i + \epsilon\nabla_x \log p_t(x) + \sqrt{2\epsilon}\, z_i,\ i = 0, 1, \ldots, K \quad \text{[Eq. 4]}$$

Here, $x_i$ represents the current LDCT image, ∈ represents the step size, $\nabla_x \log P_t(x)$ represents the gradient of the log of the probability density function for the current noise distribution, and $z_i$~N(0, I) represents the noise extracted from the standard normal distribution.

In this process, if K is sufficiently large, xx may become a noise-fitted image, where the noise characteristics of the LDCT image are adjusted to the form required by SGM.

Noise-fitting through Langevin MCMC may acts as a filtering mechanism, enabling the SGM to effectively remove noise from the LDCT image by adjusting the noise characteristics of the LDCT image. This filtering process may be performed for the purpose of reducing unnecessary noise while preserving the key characteristics of the image by adjusting the noise distribution.

The denoising unit 240 is a constituting element that may gradually reduce the noise of an LDCT image by performing the input/output operations of the score-based generative model in reverse time steps to generate a noise-reconstructed image. In this process, the denoising unit 240 is designed to gradually remove noise at each time step to generate a high-quality reconstructed image.

The denoising unit 240 may gradually reduce the noise in a noise-fitted LDCT image $LDCT_{fit}$ by using the LDCT image at the reference time step to the LDCT image at the initial time step in reverse order. This approach may enable more precise denoising by removing noise at each time step of the LDCT image.

Also, the denoising unit 240 may apply a stochastic differential equation (SDE) to gradually reduce the noise of an LDCT image to generate a high-quality noise-reconstructed image. In this process, SDE contributes to adjusting and removing the noise characteristics of LDCT images, thereby maximizing denoising performance.

The denoising unit 240 may gradually remove noise from the LDCT image through the function above, finally generate an optimized reconstruction image, and transmit the generated image to the noise-reconstructed image output unit 250.

The denoising unit 240 provides a function that not only removes noise from the LDCT image but also monitors the noise removal process at each stage in real-time to evaluate the performance. Through this function, changes occurring at each stage of the denoising process may be analyzed, and if necessary, additional adjustments may be made to derive the optimal denoising result.

Also, the denoising unit 240 may include a function to automatically adjust denoising parameters suitable for each image by considering the types and characteristics of noise that may occur in various LDCT images. This adaptive approach ensures stable performance under various conditions and may contribute to generating images optimized for each patient.

The denoising unit 240 is designed to effectively transmit an image reconstructed using an internally defined data format for smooth data communication with the subsequent noise-reconstructed image output unit 250. This structure strengthens the linkage between the denoising process and the final output process, further improving the quality of an image ultimately provided to the user.

The noise-reconstructed image output unit 250 is a constituting element that outputs a noise-reconstructed image generated based on a noise-fitted LDCT image. The noise-reconstructed image unit 250 may serves the role of finally providing the LDCT image processed by the denoising unit 240 to the user.

The noise-reconstructed image unit 250 is designed to efficiently transmit high-quality reconstruction images obtained from the denoising process, which may employ various output formats. The noise-reconstructed image unit 250 may include a function for storing, displaying, or transmitting the finally generated noise-reconstructed image to another system.

Also, the noise-reconstructed image unit 250 may apply a matrix for verifying the quality of the output image and thereby confirm whether the final image satisfies the specifications. This process serves an essential role in providing reliable information necessary for the diagnosis and treatment of patients.

The noise-reconstructed image unit 250 may provide a user-friendly interface so that the user may easily check and utilize the final result, thereby further improving the efficiency of image processing.

The controller 260 may manage the overall control operation of the SGM-based LDCT denoising neural network apparatus 100 and manage the control flow or data flow between the input unit 210, the score model unit 220, the image adjustment unit 230, the denoising unit 240, and the noise-reconstructed image output unit 250.

Figure 3:
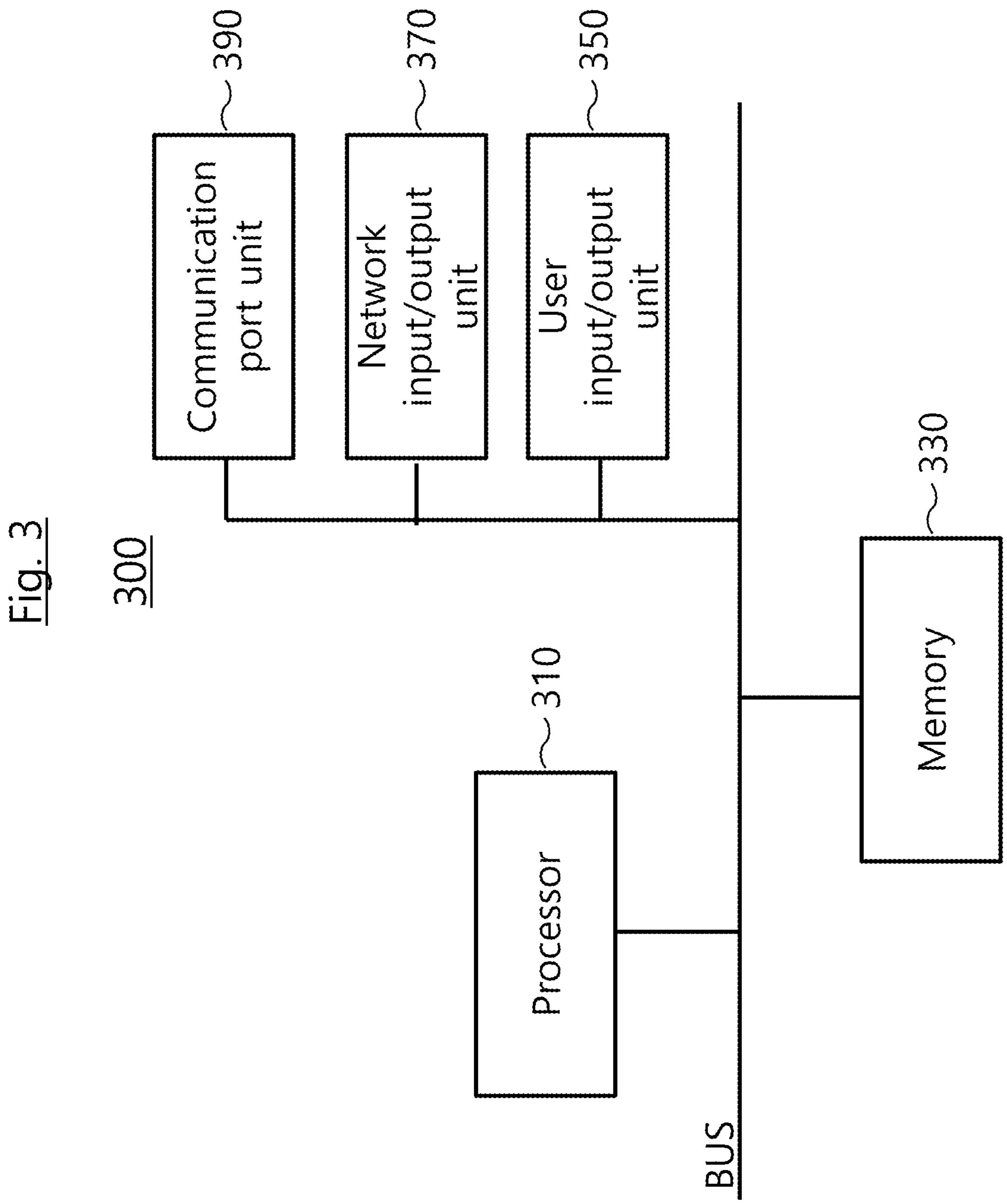
FIG. 3 illustrates the system structure of the SGM-based LDCT denoising neural network apparatus 100 of FIG. 1.

FIG. 3 illustrates the system structure of the SGM-based LDCT denoising neural network apparatus 100 of FIG. 1.

Referring to FIG. 3, the SGM-based LDCT denoising neural network apparatus 300 may include a processor 310, a memory 330, a user input/output unit 350, a network input/output unit 370, and a communication port unit 390.

The processor 310 may execute an SGM-based LDCT denoising neural network procedure according to an embodiment of the present disclosure, manage a memory 330 that is read or written in this process, and schedule a synchronization time between a volatile memory and a non-volatile memory in the memory 330. The processor 310 may control the overall operation of the SGM-based LDCT denoising neural network apparatus 100 and may be electrically connected to the memory 330, the user input/output unit 350, the network input/output unit 370, and the communication port unit 390 to control the data flow among them. The processor 310 may be implemented as a Central Processing Unit (CPU) or a Graphics Processing Unit (GPU) of the SGM-based LDCT denoising neural network apparatus 100.

The memory 330 may include an auxiliary memory device, implemented as a non-volatile memory such as a Solid State Disk (SSD) or a Hard Disk Drive (HDD) and used to store all data required for the SGM-based LDCT denoising neural network apparatus 100, and a main memory device implemented as a volatile memory such as a Random Access Memory (RAM). Also, the memory 330 may store a set of commands that, when executed by the electrically connected processor 310, execute the SGM-based LDCT denoising neural network apparatus and method according to the present disclosure.

The user input/output unit 350 includes an environment for receiving user input and an environment for outputting specific information to the user, which may include, for example, an input device including an adapter such as a touch pad, a touch screen, a virtual keyboard, or a pointing device and an output device including an adapter such as a monitor or a touch screen. In one embodiment, the user input/output unit 350 may correspond to a computing device connected via remote access, and in such a case, the SGM-based LDCT denoising neural network apparatus 100 may be operated as an independent server.

The network input/output unit 370 provides a communication environment for connecting to the user terminal via a network, which may include, for example, an adapter for communication such as a Local Area Network (LAN), a Metropolitan Area Network (MAN), a Wide Area Network (WAN), and a Value Added Network (VAN). Also, the network input/output unit 370 may be implemented to provide a short-range communication function such as WiFi or Bluetooth or a wireless communication function of 4G or higher for wireless transmission of data.

The communication port unit 390 may be implemented as a port mapping table that performs data routing while transmitting and receiving data through a network. Here, the communication port unit 390 may identify a communication session between the input unit 210 and a server by allocating a unique source port to the input unit 210 and prevent data collision during the data transmission and reception process.

FIG. 4 is a flow diagram illustrating the operation of the SGM-based LDCT denoising neural network device 100 of FIG. 1.

Referring to FIG. 4, the flow diagram 400 illustrating the operation of the SGM-based LDCT denoising neural network apparatus performs an input step 410 receiving a low-dose computed tomography (LDCT) image, a score model step 420 processing the LDCT image at each time step by constructing a score-based generative model pre-trained to remove noise from the LDCT training image, an image adjustment step 430 adjusting noise characteristics of the LDCT image by utilizing the LDCT image at a reference time step through the score-based generative model and generating a noise-fitted LDCT image, a denoising step 440 progressively removing noise from the noise-fitted LDCT image through iterative input and output operations for each reverse time step of the score-based generative model, and a noise-reconstructed image output step 450 outputting a noise-reconstructed image generated based on the noise-fitted LDCT image.

The input step 410 receives an LDCT image and initiates the subsequent processing. In this step, the LDCT image is provided to the system to serve as the basic data for the subsequent denoising process.

The score model step 420 processes the LDCT image for each time step by constructing a score-based generative model pre-trained to remove the noise from the LDCT training image. In this step, the noise characteristics learned by the model may be utilized to effectively remove noise from the LDCT image across various time steps.

The image adjustment step 430 adjusts the noise characteristics of the LDCT image and generates a noise-fitted LDCT image $LDCT_{fit}$ by utilizing the LDCT image of the reference time step through the SGM. In this step, the noise distribution of the LDCT image may be transformed into the form required by the SGM through the Langevin MCMC process to enable precise denoising.

The denoising step 440 progressively removes noise from the noise-fitted LDCT image through iterative input and output operations for each reverse time step of the score-based generative model. In this step, a stochastic differential equation (SDE) may be applied to perform noise removal at each time step.

The noise-reconstructed image output step 450 finally outputs a noise-reconstructed image generated based on the noise-fitted LDCT image. In this step, the high-quality image generated during the denoising process is provided to the user to check whether the image quality satisfies specifications.

Figure 5:
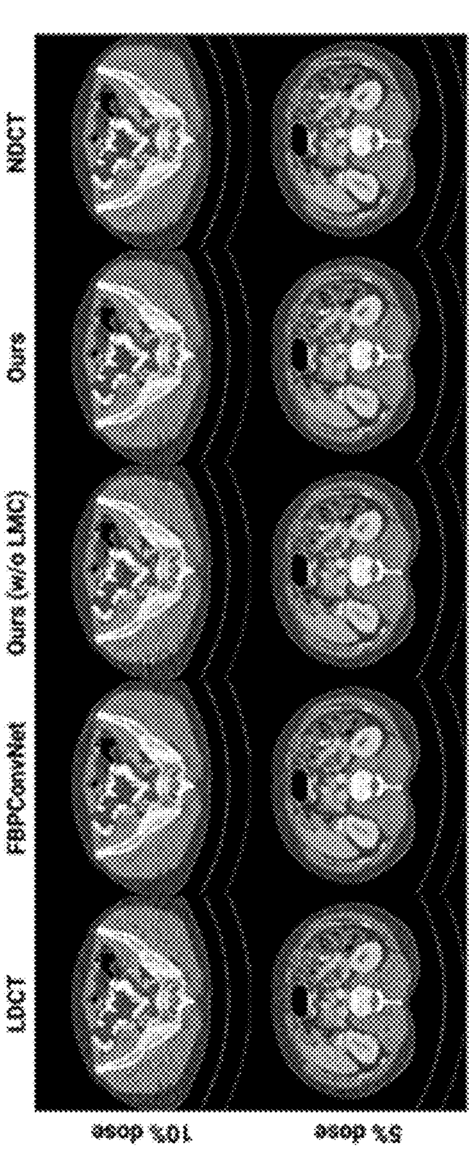
FIG. 5 shows a comparison of a low-dose computed tomography (LDCT) image, a result of FBPConvNet processing, results of the proposed method (one of the two results is obtained without using Langevin MCMC process), and a normal-dose computed tomography (NDCT) image at radiation doses of 10% and 5%.

FIG. 5 shows a comparison of a low-dose computed tomography (LDCT) image, a result of FBPConvNet processing, results of the proposed method (one of the two results is obtained without using Langevin MCMC process), and a normal-dose computed tomography (NDCT) image at radiation doses of 10% and 5%.

The first column (LDCT) shows LDCT images captured on 10% and 5% dose levels, respectively. These images often exhibit a high level of noise, resulting in the loss of detailed information.

The second column (FBPConvNet) shows the LDCT images processed using FBPConvNet. This method reduces noise, but the detailed structure of the image is overly smoothed, resulting in the loss of actual detailed information.

The third column (Ours w/o LMC) shows the results of the proposed method, which is the denoising result without using the Langevin MCMC process. The images show reduced noise, but there remains room for further improvement in terms of preserving detailed information.

The fourth column (Ours) shows the LDCT images processed using the proposed method, where the noise is effectively removed and the details of the NDCT images are well preserved.

The fifth column (NDCT) shows the NDCT images, which typically include high-quality detailed information.

FBPConvNet effectively reduces noise but tends to overly smooth the overall anatomical structure. On the other hand, the proposed method may maintain the texture of CT images under both dose conditions and generate realistic CT images. Also, the application of LMC contributes to significantly reducing artifacts while minimizing structural deformation.

Next, the performance of LDCT, FBPConvNet, and the proposed method may be quantitatively compared to complement the visual results. Table 1 below shows the average RMSE, SSIM, and LPIPS values of LDCT, FBPConvNet, and the proposed method (including application of LMC depending on the apparatus) on 10% dose level.

TABLE 1

Averge RMSE, SSIM, LPIPS comparison for the 10% dose level. RMSE values are scaled by a factor of $10^8$.

| | LDCT | FBPConvNet | Ours (w/o LMC) | Ours |
|---|---|---|---|---|
| RMSE ↓ | 1.1907 | 0.6095 | 0.8096 | 0.7325 |
| SSIM ↑ | 0.8071 | 0.9354 | 0.8935 | 0.9110 |
| LPIPS ↓ | 0.0527 | 0.0414 | 0.0155 | 0.0168 |

The results show that FBPConvNet exhibits better RMSE and SSIM values, attributed to the advantages of supervised learning. On the other hand, the proposed method demonstrates superior LPIPS values, indicating better perceptual similarity.

Table 2 shows the performance comparison result on 5% dose level.

TABLE 2

Average RMSE, SSIM, LPIPS comparison for the 5% dose level. RMSE values are scaled by a factor of $10^8$.

| | LDCT | FBPConvNet | Ours (w/o LMC) | Ours |
|---|---|---|---|---|
| RMSE ↓ | 1.6562 | 0.6250 | 1.0205 | 0.8698 |
| SSIM ↑ | 0.7645 | 0.9173 | 0.8456 | 0.8810 |
| LPIPS ↓ | 0.1034 | 0.0509 | 0.0330 | 0.0224 |

In Table 2 above, although FBPConvNet still shows superior results in RMSE and SSIM, the proposed method shows better performance in noise reduction. In particular, it should be noted that the proposed method only requires NDCT data for training, eliminating the need for paired data.

The quantitative results above further highlight the effectiveness of the proposed method, demonstrating its ability to effectively reduces noise in LDCT images while preserving detailed information.

The SGM-based LDCT denoising neural network apparatus 100 proposed in the present disclosure employs a score-based generative model (SGM) pre-trained to effectively remove the noise in the LDCT images. The apparatus may greatly improve the image quality by processing the LDCT images, reducing noise in the LDCT images while simultaneously preserving essential, detailed texture information.

The SGM-based LDCT denoising neural network apparatus 100 is designed to provide a function capable of adaptively adjusting $t_{fit}$ according to the characteristics of individual CT images, thereby ensuring consistent performance regardless of dose levels. This technical development may contribute to improving robustness of the apparatus across diverse medical environments.

Additionally, improvements to the SGM model include expansion of the training dataset, structural innovation, and improvement of the training protocol, which highlights the potential to further increase the efficiency of the proposed method.

Although the present disclosure has been described with reference to preferred embodiments given above, it should be understood by those skilled in the art that various modifications and variations of the present disclosure may be made without departing from the technical principles and scope specified by the appended claims below.

Acknowledgement

[Project Serial No] 2710006677
[Project No] RS-2020-II201361
[Department] Ministry of Science and ICT
[Project management (Professional) Institute] Institute of Information & Communications Technology Planning & Evaluation
[Research Project Name] Nurturing ICT and Broadcasting Innovation Talents
[Research Task Name] Artificial Intelligence Graduate School Support Project (Yonsei University)

[Project Performing Institute] University Industry Foundation, Yonsei University
[Research Period] 2024.01.01~2024.12.31
[Project Serial No] 2710002082
[Project No] RS-2023-00240135
[Department] Ministry of Science and ICT
[Project management (Professional) Institute] National Research Foundation of Korea
[Research Project Name] Fundamental Technology Development Program
[Research Task Name] Development of Multiple CNT X-ray source based C-arm CT system with 3D spatial navigation for guiding image based robotic surgery
[Project Performing Institute] University Industry Foundation, Yonsei University
[Research Period] 2024.01.01~2024.12.31

[Detailed Description of Main Elements]

| | |
|---|---|
| 100: SGM-based LDCT denoising neural network apparatus | |
| 110: Input unit | 120: Score model unit |
| 130: Image adjustment unit | 140: Denoising unit |
| 150: Noise-reconstructed image output unit | |
| 100: SGM-based LDCT denoising neural network apparatus | |
| 210: Input unit | 220: Score model unit |
| 230: Image adjustment unit | 240: Denoising unit |
| 250: Noise-reconstructed image output unit | 260: Controller |

What is claimed is:

1. A score-based generative model (SGM)-based low-dose computed tomography (LDCT) denoising neural network apparatus comprising:

an input unit receiving an LDCT image;

a score model unit processing the LDCT image at each time step by constructing a score-based generative model pre-trained to remove noise from the LDCT training image;

an image adjustment unit adjusting noise characteristics of the LDCT image by utilizing the LDCT image at a reference time step through the score-based generative model and generating a noise-fitted LDCT image;

a denoising unit progressively removing noise from the noise-fitted LDCT image through iterative input and output operations for each reverse time step of the score-based generative model; and a noise-reconstructed image output unit outputting a noise-reconstructed image generated based on the noise-fitted LDCT image.

2. The apparatus of claim 1, wherein the score model unit trains the score-based generative model on noise-added data at various time steps of the LDCT training image.

3. The apparatus of claim 2, wherein the score model unit removes the noise of the LDCT image at the reference time step ($t=t_{fit}$) and provides the noise-removed LDCT image as an input image to the image adjustment unit.

4. The apparatus of claim 2, wherein the score model unit processes the noise of the LDCT image from the reference time step ($t=t_{fit}$) to the initial time step ($t=0$) at each reverse time step and provides the processed LDCT image as an input image to the denoising unit.

5. The apparatus of claim 1, wherein the image adjustment unit adjusts the noise characteristics through Langevin MCMC (Markov Chain Monte Carlo) process.

6. The apparatus of claim 1, wherein the image adjustment unit performs a noise filtering process on the LDCT image through a noise characteristic adjustment process.

7. The apparatus of claim 1, wherein the denoising unit generates the noise-reconstructed image for the noise-fitted LDCT image by reversely utilizing the LDCT image at the reference time step to the LDCT image at the initial time step through the score-based generative model.

8. The apparatus of claim 7, wherein the denoising unit generates the noise-reconstructed image by applying a stochastic differential equation (SDE).

9. The apparatus of claim 1, wherein the denoising unit performs an inverse transformation reconstruction process on the LDCT image through a noise-temporally inverse transformation process.

10. A Score-based Generative Model (SGM)-based LDCT denoising neural network method performed in an SGM-based LDCT denoising neural network apparatus, the method comprising:

an input step receiving a low-dose computed tomography (LDCT) image;

a score model step processing the LDCT image at each time step by constructing a score-based generative model pre-trained to remove noise from the LDCT training image;

an image adjustment step adjusting noise characteristics of the LDCT image by utilizing the LDCT image at a reference time step through the score-based generative model and generating a noise-fitted LDCT image;

a denoising step progressively removing noise from the noise-fitted LDCT image through iterative input and output operations for each reverse time step of the score-based generative model; and a noise-reconstructed image output step outputting a noise-reconstructed image generated based on the noise-fitted LDCT image.

* * * * *